United States Patent
Henke et al.

(10) Patent No.: US 12,434,086 B2
(45) Date of Patent: Oct. 7, 2025

(54) LEAK RATE MONITORING FOR A FIRE SPRINKLER SYSTEM

(71) Applicant: Potter Electric Signal Company, LLC, Maryland Heights, MO (US)

(72) Inventors: Mike Henke, Florissant, MO (US); Timothy Decker, Florissant, MO (US); Jason Webb, Urich, MO (US); Andrew Kaempfer, Eureka, MO (US)

(73) Assignee: Potter Electric Signal Company, LLC, Maryland Heights, MO (US)

( * ) Notice: Subject to any disclaimer, the term of this patent is extended or adjusted under 35 U.S.C. 154(b) by 0 days.

(21) Appl. No.: 18/747,179

(22) Filed: Jun. 18, 2024

(65) Prior Publication Data

US 2024/0335691 A1    Oct. 10, 2024

Related U.S. Application Data

(62) Division of application No. 17/239,134, filed on Apr. 23, 2021, now Pat. No. 12,036,432.

(60) Provisional application No. 63/014,538, filed on Apr. 23, 2020, provisional application No. 63/043,578, filed on Jun. 24, 2020.

(51) Int. Cl.
   *A62C 37/50*    (2006.01)
   *A62C 35/64*    (2006.01)
   *A62C 35/68*    (2006.01)

(52) U.S. Cl.
   CPC ............ *A62C 37/50* (2013.01); *A62C 35/645* (2013.01); *A62C 35/68* (2013.01)

(58) Field of Classification Search
   CPC ....... A62C 35/62; A62C 35/64; A62C 35/645; A62C 35/68; A62C 37/50; A62C 99/009
   See application file for complete search history.

(56) References Cited

U.S. PATENT DOCUMENTS

| | | | |
|---|---|---|---|
| 5,864,287 A | 1/1999 | Evans, Jr. et al. | |
| 5,971,080 A | 10/1999 | Loh et al. | |
| 8,763,711 B2 | 7/2014 | Stephens | |
| 10,933,266 B1 * | 3/2021 | Hedeen | F04B 41/02 |
| 2010/0263882 A1 * | 10/2010 | Bodemann | F16K 15/04 |
| | | | 137/15.04 |

(Continued)

FOREIGN PATENT DOCUMENTS

| | | |
|---|---|---|
| JP | 2009061247 A | 3/2009 |
| KR | 101692827 B1 | 1/2017 |

OTHER PUBLICATIONS

International Search Report and Written Opinion in PCT/US2021/028897, mailed Aug. 12, 2021, 9 pages.

*Primary Examiner* — Darren W Gorman

(74) *Attorney, Agent, or Firm* — Lewis Rice LLC

(57) ABSTRACT

A monitoring and testing system which is designed to automatically seal off the system from its gas supply and monitor internal pressure during that time to perform regulatory testing. The scheduling can be automated and can be done without maintenance personnel having to monitor the time passage and pressure manually. The system may also be designed to monitor operation of the air compressor, or related gas supply device, and evaluate if the operation of the gas supply is operating in a fashion indicative of a larger than desired leak. This effectively allows the system to monitor pressure changes during regular operation and on a somewhat continuous basis.

4 Claims, 2 Drawing Sheets

(56) References Cited

U.S. PATENT DOCUMENTS

| | | |
|---|---|---|
| 2013/0168109 A1 | 7/2013 | Kochelek et al. |
| 2015/0297930 A1* | 10/2015 | Nikkarila ............... A62C 37/40 169/46 |
| 2017/0100617 A1* | 4/2017 | Kochelek ............... A62C 37/50 |
| 2018/0214725 A1 | 8/2018 | Tihen et al. |
| 2019/0091500 A1 | 3/2019 | Jimenez et al. |
| 2021/0268322 A1 | 9/2021 | Thomas et al. |

* cited by examiner

LEAK RATE MONITORING FOR A FIRE SPRINKLER SYSTEM

CROSS REFERENCE TO RELATED APPLICATIONS

This application is a Divisional of U.S. patent application Ser. No. 17/239,134, filed Apr. 23, 2021 which claims benefit of U.S. Provisional Patent Application No. 63/014,538 filed Apr. 23, 2020, and U.S. Provisional Patent Application No. 63/043,578 filed Jun. 24, 2020. The entire disclosure of all the above documents is herein incorporated by reference.

BACKGROUND OF THE INVENTION

Field of the Invention

The present invention generally relates to monitoring and testing for fire sprinkler systems. Particularly to systems which can automatically perform required leak testing and monitoring without a need to drain the sprinkler system.

Description of the Related Art

Piping and other metal systems in contact with water, air, or other chemicals are often subject to chemical corrosion where the metals' contact with the substance can cause a reaction altering the chemical structure of the metal. The most well known type of chemical corrosion of metal is rust, or the oxidation of iron. In addition to chemical corrosion, corrosion can also be caused by microbial growth on the metal which is often referred to as MIC (Microbiologically Influenced Corrosion).

Because corrosion can cause structural failure of metallic systems such as fire suppression systems, a number of systems and methods have been proposed to try and reduce or eliminate corrosion in a variety of circumstances. Since corrosion generally requires either the presence of microbes (which usually are carried in water), or the presence of water and oxygen, one of the most common ways to try and reduce corrosion is to eliminate standing water. With regards to standing water within a fire suppression system, the most common way to do this currently is to utilize what is commonly called a dry pipe or pre-action pipe system.

In dry and pre-action pipe systems, the pipes in the sprinkler system are not filled with water but are filled with pressurized gas. The pressure of the gas in the sprinkler system serves to hold down a clapper valve on the dry pipe which in turn holds back the water which may be in a pressurized municipal system or some form of pressurized tank. When a sprinkler head activates, the gas is initially released from the sprinkler head and the gas pressure drops in the dry pipe system. Once the pressure drops below a threshold, the clapper opens and pressurized water enters the pipe. The water will flow toward the sprinkler head continuing to push out gas and supplant it with water until the water itself reaches the sprinkler head and begins to be sprayed on the fire.

The pressure at which the gas is placed in the sprinkler system is called "supervisory pressure" in the art. The most common way to supply the supervisory gas pressure in a dry pipe system is a gas supply system such as an air compressor. The air compressor will generally be connected to an air maintenance device to regulate pressure inside the sprinkler system or may be directly connected to the sprinkler system in alternative arrangements. In still further systems, an air compressor may be supplemented or replaced with a nitrogen generation system or a source of compressed and pressurized gas as part of the gas supply system. These can supply more inert gas to the system.

As dry and pre-action fire sprinkler systems will also invariably leak gas over time, the gas supply will also supply gas to maintain the pressure. The same air compressor used for filling has typically been used as the refill system and may supply gas directly when called for due to a decrease in gas pressure. Alternatively, the air compressor may supply gas to a tank which then has pressurized gas available which can readily be supplied to the sprinkler system to quickly refill any lost gas.

Leaks develop in the sprinkler system from holes created due to corrosion, gaskets leaking, buildings settling and many other reasons and are simply an accepted part of fire protection systems. To make sure leaks do not compromise the functionality of the system, or result in damage, National Fire Protection Association code 13 (NFPA 13) provides that a new sprinkler system is only allowed to leak 1.5 PSI per 24 hours. An existing system, however, can leak at 3 psi per 2 hours in accordance with National Fire Protection Association code 25 (NFPA 25). NFPA 25 also requires that existing systems be tested at a minimum of every 3 years to assure that they do not leak more than allowed.

While fire requirements specify the maximum allowed leak rates, it should be apparent that actual leak rates will vary from system to system and over time. Increases in leak rates, even if not sufficient to result in a code failure, can cause additional wear and tear on systems that provide maintenance or make-up air. In some cases, increased leaks could require greater volumetric draw than the air supply can handle. This can be particularly true of systems that rely on inert air as the supply may be more limited. If this happens, the pressure in the sprinkler system can drop and cause low pressure alarms, and in some cases false activations.

Further, NFPA testing is a relatively long and manual process. NFPA 13 testing has traditionally required sealing off the system from its air supply for 24 hours to detect decreases in pressure and the systems used for measurement are typically not particularly sophisticated. A technician simply shuts off the air supply (or otherwise isolates the system from the air supply), makes a mark on a pressure gauge connected to the sprinkler system at the current pressure, and returns 24 hours later to see how much pressure is lost according to the same gauge. As this is for a new system, the system is typically not in use during this time so the long window does not create an overtly dangerous situation, but the manual nature of the process can introduce errors and it requires a technician to perform.

NFPA 25 testing can be a little more disruptive. The basics of an NFPA 25 test follow the same process as an NFPA 13 test except that the test only takes place over 2 hours, and the allowed pressure loss is much greater. However, during the time of this test, the system may not be able to respond correctly or quickly to a fire situation and is both disruptive to system operation and typically requires on site personnel. As NFPA 25 requires that all systems in operation be checked a minimum of every three years, meeting regulatory requirements results in regular disruption and work.

Further, because of the disruptive and manual nature of NFPA 25, NFPA 25 type testing is often not performed at quicker intervals than those required even though knowledge of system leaking can actually reduce maintenance costs in the end. Thus, systems in use can develop leaks which may be sufficient to exceed NFPA 25 but which are not detected for a relatively long period of time. Further, systems which are starting to leak additional amounts are often not detected when making repairs would be simple. These issues can lead to increased wear on gas supply systems, increased maintenance costs when issues are detected, and a potential false activation of the system if the leak is sufficiently large.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, there is described herein a monitoring and testing system which is designed to automatically seal off the system from its gas supply and monitor internal pressure during that time to perform regulatory testing. The scheduling can be automated and can be done without maintenance personnel having to monitor the time passage and pressure manually. The system may also be designed to monitor operation of the air compressor, or related gas supply device, and evaluate if the operation of the gas supply is operating in a fashion indicative of a larger than desired leak. This effectively allows the system to monitor pressure changes during regular operation and on a somewhat continuous basis.

Described herein, among other things, is a system for automatically determining the leak rate of a fire sprinkler system and a method of using the system, the system comprising: a fire sprinkler system which is to be maintained at a system pressure above ambient; a compressor for supplying gas to the fire sprinkler system to maintain the fire sprinkler at the system pressure; a computer controller; a sensor on the fire sprinkler system for reporting the system pressure to the computer controller; and a valve operable by the computer controller for isolating the fire sprinkler system from the compressor.

In an embodiment, the system further comprises a reservoir tank which is supplied gas by the compressor and supplies gas to the fire sprinkler system.

In an embodiment of the system, the reservoir tank is maintained at a tank pressure above the system pressure.

In an embodiment of the system, the system pressure is about 40 PSIG and the tank pressure is about 60 to about 65 PSIG.

In an embodiment, the system, further comprises a tank sensor on the reservoir tank for reporting the tank pressure to the computer controller.

In an embodiment of the system, the gas comprises air.

In an embodiment of the system, the gas comprises nitrogen.

There is also described herein, in an embodiment, a method for automatically determining the leak rate of a fire sprinkler system, the method comprising: providing a fire sprinkler system which is to be maintained at a system pressure above ambient; providing a compressor for supplying gas to the fire sprinkler system to maintain the fire sprinkler at the system pressure; repeatedly sensing the system pressure is below a cut-in pressure and activating the compressor, the compressor supplying gas to the fire sprinkler system until the system pressure is at a cut-out pressure when the compressor ceases supplying gas; measuring an amount of time lapsed between a first time when the system pressure is at the cut-out pressure and a subsequent time when the system pressure is at the cut-in pressure; and using the time lapsed and the difference between the cut-out pressure and the cut-in pressure to calculate a leak rate for the fire sprinkler system.

In an embodiment of the method, the gas comprises air.

In an embodiment of the method, the gas comprises nitrogen.

In an embodiment of the method, the calculated leak rate is used to schedule a further leak test of the fire sprinkler system.

There is also described herein, in an embodiment, a method for automatically determining the leak rate of a fire sprinkler system, the method comprising: providing a fire sprinkler system which is to be maintained at a system pressure above ambient; providing a reservoir tank with a tank pressure above the system pressure and maintaining the fire sprinkler at the system pressure; providing a compressor for supplying gas to the reservoir tank; repeatedly sensing the tank pressure is below a cut-in pressure and activating the compressor, the compressor supplying gas to the reservoir tank until the tank pressure is at a cut-out pressure when the compressor ceases supplying gas; measuring an amount of time lapsed between a first time when the tank pressure is at the cut-out pressure and a subsequent time when the tank pressure is at the cut-in pressure; and using the time lapsed and the difference between the cut-out pressure and the cut-in pressure to calculate a leak rate for the fire sprinkler system.

In an embodiment of the method, the system pressure is about 40 PSIG and the tank pressure is about 60 to about 65 PSIG.

In an embodiment of the method, the gas comprises air.

In an embodiment of the method, the gas comprises nitrogen.

In an embodiment of the method, the calculated leak rate is used to schedule a further leak test of the fire sprinkler system.

DETAILED DESCRIPTION OF PREFERRED EMBODIMENTS

Figure 1:
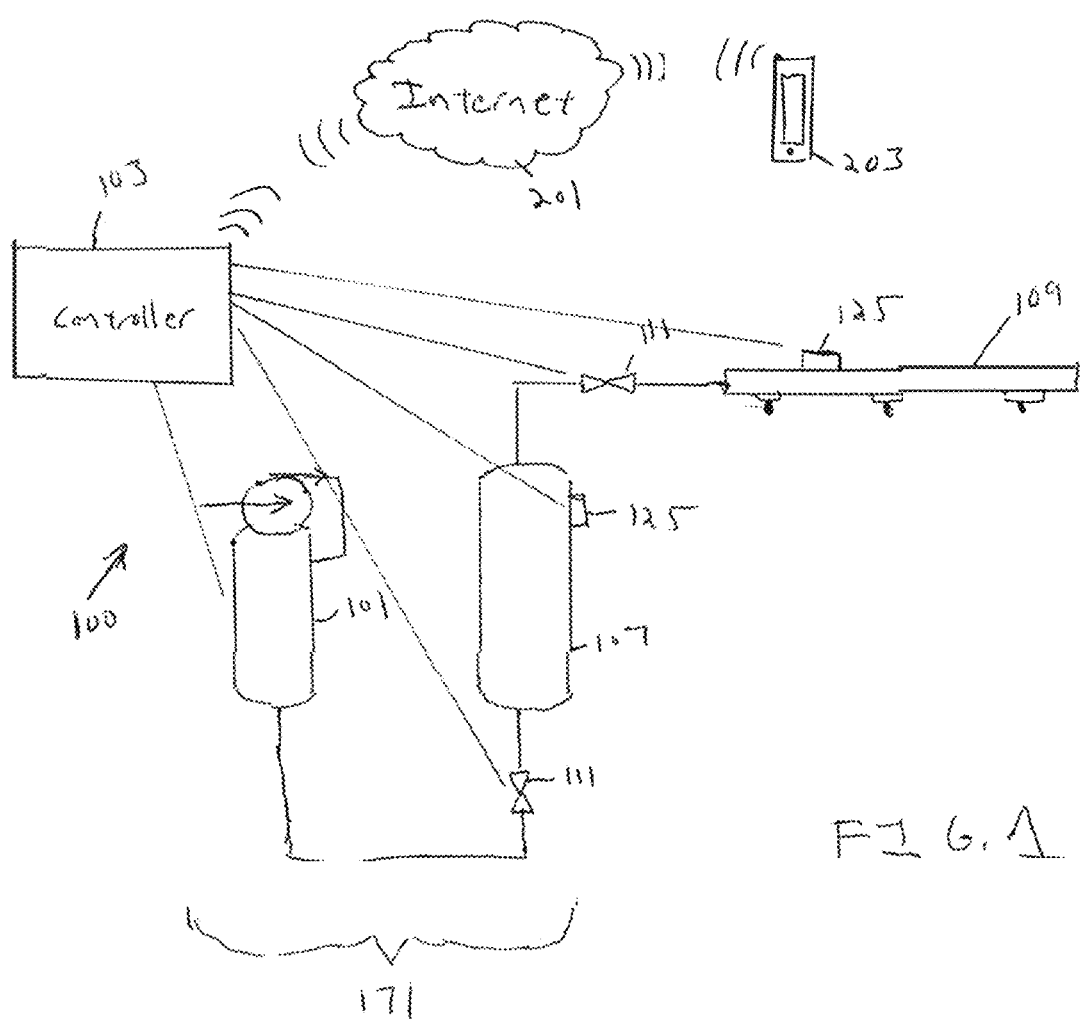
FIG. 1 provides a block diagram of a first embodiment of a leak rate monitoring system in place in a fire sprinkler system.
Figure 2:
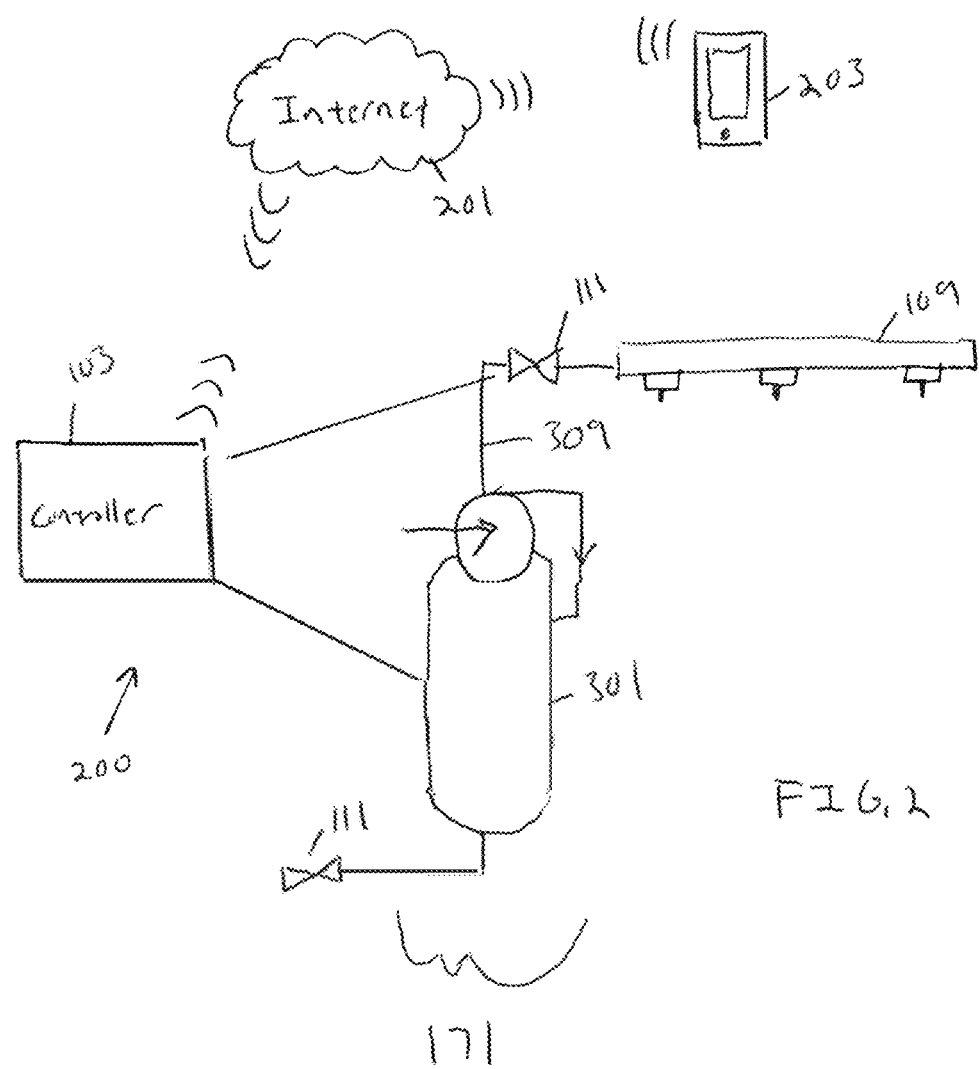
FIG. 2 provides a block diagram of a second embodiment of a leak rate monitoring system in place in a fire sprinkler system.

It will be readily understood that the components of the present invention, as generally described and illustrated in the figures herein, could be arranged and designed in a wide variety of different configurations, thus, the following more detailed descriptions of the embodiments of a system as represented in FIGS. 1 and 2 are not intended to limit the scope of the invention, as claimed, but are merely representative of presently preferred embodiments.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wrist-wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, may refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software may be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth™ and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including, but not necessarily limited to, a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

For purposes of this disclosure, there will also be significant discussion of a special type of computer referred to as a "mobile communication device" or simply "smart device". A mobile communication device may be, but is not limited to, a cellular phone, a smartphone, tablet PC, e-reader, satellite navigation system ("SatNav"), fitness device (e.g. a Fitbit™ or Jawbone™) or any other type of mobile computer, whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network. A mobile communication device will almost always include its own power supply which is commonly in the form of a rechargeable battery.

FIG. 1 provides for a general block diagram showing an automated leak rate testing and monitoring system (100) for a dry pipe sprinkler system (109). The monitoring system (100) will provide for one or more valves (111) under the control of an electronic controller (103), such as a computer with appropriate software, a hardware control board, or a mechanical control system. The valves (111) will typically be either solenoid or pneumatic valves with an appropriate connection to electric, air, or other activation sources. The positions of the valves (111) are generally monitored and altered by the controller (103) through the use of appropriate sensors and control hardware.

The controller (103) will also have attached thereto sensors (125) to provide feedback about details of the sprinkler system (109). In particular, the controller (103) will obtain measurements about the pressure of the gas within the sprinkler system (109), the volume and type of gas in the sprinkler system (109), the current discharge rate into the sprinkler system (109), and/or the currently set bleed rate for a purge. The sensors (125) may be positioned anywhere in the sprinkler system (109) appropriate to give desired feedback. The sensors (125) may also be connected to other systems which are connected to the sprinkler system (109) if such arrangement is appropriate to determine the gas pressure within the sprinkler system (109).

In the embodiment of FIG. 1, the system (100) will have a gas source (171) used to supply the fill gas for the sprinkler system (109) via the valves (111). The gas source (171) may be any type of gas source including, but not limited to, tanks of compressed gas, compressors, regulators, municipal sources or any other sources of pressurized gas alone or in combination. The gas source (171) may also supply any kind of gas. This may be, but is not limited to, atmospheric gases such as air (in any composition), or a specialized or purified gas such as, but not limited to, nitrogen, carbon dioxide, or helium. The gas source (171) may also include filters or other items to alter gas composition for example moisture filters or nitrogen membranes.

In the presently depicted embodiments of FIG. 1, the gas source (171) comprises a compressor (101) which will generally act to compress atmospheric air into a reservoir tank (107). The compressor (101) may also be able to bypass the reservoir tank (107) and supply gas to the sprinkler system (109) directly. As part of supplying gas to the tank (107), the compressor (101) may alter the composition of the gas from the source. For example, the gas source (171) can include a moisture filter. In a still further example, the gas source (171) can comprise an alternative nitrogen and air supply system such as that shown in U.S. patent application Ser. No. 15/884,049 the entire disclosure of which is herein incorporated by reference.

In the depicted embodiment, the gas source (171) is also controlled by the controller (103) and operation of the gas source (171) in normal operation can depend on the specific design of the system (100). In an embodiment, the supply from the reservoir tank (107) to the sprinkler system (109) may be essentially continuous where the pressure in the reservoir tank (107) is higher than the pressure in the sprinkler system (109) and any air lost in the sprinkler system (109) is immediately replaced, or the reservoir tank (107) may provide gas to the sprinkler system (109) at intervals or upon detection by the controller (103) of the pressure in the sprinkler system (109) having been reduced to a particular trigger point. In this type of embodiment, a sensor (125) may also or alternatively be positioned on the tank (107).

While the inclusion of a reservoir tank (107) is generally preferred, it will be understood that in alternative embodiments, the reservoir tank (107) may be removed and the compressor (101) can provide fill gas directly to the sprinkler system (109) upon generation. In such an embodiment, the reservoir tank (107) could be eliminated from the gas system (171) shown in FIG. 1, and the piping would connect to the sprinkler system (109) directly. Such a connection may also be included in addition to the reservoir tank (107) in a still further embodiment to provide another alternative arrangement. In an embodiment without a reservoir tank (107), the sprinkler system (109), or a portion thereof, may actually behave as the reservoir tank (107) does in the embodiment of FIG. 1. In such an embodiment, the pressure in this portion of the sprinkler system (109) may be measured directly. In a still further embodiment, the reservoir tank (107) and the sprinkler system (109) may be maintained at the same pressure. In this way, the pressure in the reservoir tank (107) may be measured and this can be used to determine the pressure in the sprinkler system (109) and be used to determine when to activate the compressor (101).

In an exemplary embodiment, the sprinkler system (109) will be provided with a supervisory pressure of about 40 PSIG and the reservoir tank (107) with a higher pressure such as, but not limited to, of about 60-80 PSIG. These values are provided merely for illustrative example and is used throughout this disclosure to illustrate a particular operation but are not required. One of ordinary skill in the art would understand that the supervisory pressure can be any value and will commonly be between about 10 psi to about 60 psi. Similarly, reservoir tank (107) pressures can also be any value and will commonly range from about 50 psi to about 175 psi. Further, as contemplated above, in an alternative embodiment, the pressure in the reservoir tank (107) and the sprinkler system (109) may be the same allowing the pressure in the reservoir tank (107) to act as an indicator of the pressure in the sprinkler system (109) and this pressure could be any value appropriate for the sprinkler system (109) and reservoir tank (107) in combination.

In the embodiment of FIG. 1, when the sprinkler system (109) has reduced pressure, gas will be provided to the sprinkler system (109) from the reservoir tank (107). Once the gas has begun to enter the sprinkler system (109), the pressure in the tank (107) will typically begin to fall. This pressure decrease can be detected by a sensor (125), and the compressor (101) may be actuated to provide more gas to the reservoir tank (107). Once the sprinkler system (109) has been determined to be at sufficient pressure the connection from the reservoir tank (107) to the sprinkler system (109) will wait until additional makeup gas is necessary. During this time, the reservoir tank (107) may be filled to its set point (generally around 80 psi, but this is not required) at which point the compressor (101) is shut off.

Assuming there are no leaks in the system (109), the reservoir tank (107) should remain at the set point pressure without further action indefinitely. However, generally there will be an amount of gas leakage within the sprinkler system (109). When a reduction in pressure in the sprinkler system (109) is detected (which may be via the controller (103) and a sensor (125) or due to simple pressure differential between the reservoir tank (107) and the sprinkler system (109) such as through a specific pressure valve or regulator calibrated for the purpose), the reservoir tank (107) will generally provide fill gas to return the sprinkler system (109) to pressure. As gas flows from the reservoir tank (107), the reservoir tank (107) pressure decreases.

Generally, as opposed to operating the compressor (101) immediately upon pressure decrease in the reservoir tank (107), instead when the reservoir tank (107) hits a particular target pressure, often around 60 PSIG, the controller (103)

will determine that the reservoir tank (107) needs to be refilled and the controller (103) will trigger the compressor (101) to operate. The gas will be fed to the tank (107) until the pressure in the reservoir tank (107) is restored to its target holding pressure (e.g. 80 PSIG). The system (100) will generally operate in the above maintenance mode indefinitely so long as there are no leaks in the sprinkler system (109), or anywhere else in the gas path, that are large enough to allow more gas to escape than can be generated by normal operation of the compressor (101).

In order to provide for leak rate monitoring and testing, there are generally two situations in which the system (100) will operate as an automated testing system. The first is for initial testing of a new system to comply with NFPA 13, the second is to perform an NFPA 25 test either to meet regulatory requirements (e.g. as required every 3 years), based on a different fixed schedule, upon demand, or any combination of these. There is also provided a third mode of testing which provides for essentially continuous monitoring which can be used to schedule an additional NFPA 25 test, to alter maintenance schedules, to suggest particular maintenance be performed, or for other purposes as desired.

The two NFPA forms of testing are typically performed using the same protocols as are currently in place for manual testing. However, the system can perform the tests automatically and record the outcomes automatically. The system can then also report or record results, or even trigger an alarm situation if a situation of concern is detected.

The only real difference between performing an NFPA 13 versus and NFPA 25 test is the time window over which the test is performed and the amount of pressure loss which is allowed in the time period. Thus, performance of the system of either test will be discussed together. To perform an NFPA test The controller (103) will generally determine that a test needs to be performed. This may be on demand by a request from a user or other entity (such as a regulatory authority), or may be in accordance with a previously provided schedule of testing. Typically, the NFPA 13 test will be specifically requested as it is only typically performed when the sprinkler system (109) is initialized. The NFPA 25 test may be performed on demand in the same fashion or may be performed in accordance with a prepared test protocol or both.

A prepared test protocol, if one is being used, will typically be programmed into the controller (103) and will provide for a calendar, or similar, schedule for when a test is to be performed. This may be provided to meet regulatory requirements (for example being performed every 3 years) or may be scheduled more often if desired. The key in this type of pre-scheduled operation is that the time of the testing has been set in advance. Upon the time for a test to be performed being reached, the system (100) will typically first insure that the system (100) is not in a situation where performing the test would be dangerous. For example, the system may determine if an alarm situation currently exists, or may verify that a building is unoccupied or closed for example. It may also request manual confirmation from an on site or remote technician (such as one accessing the controller (103) over a network (201) via a mobile device (203)).

Upon it being determined that the test can be safely performed and is to be performed, the controller (103) will typically obtain the pressure value of the sensor (125) in the sprinkler system and/or reservoir tank (107). The controller may then close valves (111) in a manner to isolate the sprinkler system (109) from the gas source (171). This may serve to isolate the sprinkler system (109) from the reservoir tank (107) so that the sprinkler system (109) is measured independently or may include the tank (107) with the sprinkler system (109) to measure both in combination.

The water source will also typically be isolated from the sprinkler system (109) so that a pressure drop of sufficient magnitude during the test does not result in the clapper valve holding back the water being opened. This isolation may be through the use of an additional valve to isolate the water source controller by the controller (103) or may be through the clapper valve being held closed by the controller (103). In a still further embodiment, isolation of the sprinkler system (109) from the reservoir tank (107) and/or gas source (171) may also serve to isolate the sprinkler system (109) from the water source.

Regardless, once the sprinkler system (109) is isolated from a source of additional gas (specifically, it is isolated from the compressor (101)), the initial value of the sensor(s) (125) are recorded. A countdown timer will then carry out the test over the desired time window. This will typically be 2 hours for an NFPA 25 test or 24 hours for an NFPA 13 test. However, in the event that the test is not specifically for regulatory purposes, the time window may be for a differently selected amount of time. Once the time has expired, the pressure at the sensors (125) is again recorded. The valves (111) will then typically be reopened to allow for the system (109) to return to supervisory pressure.

The measures of the sensors (125) may now be compared and the result may be adjusted to a fixed time period if desired. For example, if the test was performed for 4 hours, the pressure loss may be presented as an average loss over 2 hours for example. The pressure loss will also typically be provided as either the sprinkler system (109) loss alone, reservoir tank (107) loss alone, reservoir tank (107) and sprinkler system (109) loss in combination, or any combination of the above. The pressure losses and time windows may be provided to the user. This may be reported directly to the user via the controller (103), or the controller (103) may provide the value via a network (201), such as the Internet, or other system to a remote server, other system (such as a sprinkler supervisory system), or to a smart device (203) which may be accessible by the user. This communication may be wired or wireless via a transmitter in the controller (103). In the event that this is a regulatory test, a pass or fail may be provided and may be sent directly to a regulatory authority to verify its integrity. Further, depending on the result of the test, an alarm condition may also be provided to the user if the outcome of the test is concerning.

Specific testing periods and methods can be virtually anything, however, it may be desirable to provide for testing throughout a fixed window such as one day. This may be particularly valuable when performing an NFPA 13 test for example. In an embodiment, the controller (103) may be programmable for a preset number of isolation periods throughout the main isolation window as well as for the duration of the isolation window. For example, the controller (103) may be programmed to test four times throughout the day, spaced at six-hour intervals, and for sixty minutes. Longer patterns such as testing four-times daily, with each comprising a sixty minute duration but continuing for a total of 7 days and providing an average can also be performed. Tests can also be performed at the same or different times of the day, in conjunction with changing seasons, or even based on the output of additional sensors. For example, a test may be performed if the temperature is detected to fall a certain number of degrees.

While the above contemplates the performance of testing where the sprinkler system (109) is isolated from the gas source (171), it should be recognized that the testing system may be able to be performed while maintaining the system in operation if an alarm situation can be detected and allow for the testing to immediately cease. Specifically, should the controller (103) be presented with an alarm situation (e.g. because of a smoke detector indicating an alarm or because a manual alarm box was triggered), the controller (103) may immediately cease the test, open all closed valves, and return the system to immediate standard operation. Should a sufficient pressure drop (either in total or specifically via the pattern in which the drop occurs) be detected by the controller (103) during the test to potentially indicate a sprinkler activation, the controller (103) may also immediately return the system to standard operation.

Further, while the forms of testing discussed above directly detects pressure loss from leaks over time, the pressure maintenance operation of the system may be monitored and serve to provide for additional, and essentially continuous, pressure monitoring without the need to isolate the sprinkler system (109) from the air supply (171).

As discussed above, in normal operation of the system (100) pressure lost in the sprinkler system (109) and is replaced by gas flowing into the sprinkler system (109) from the reservoir tank (107). As gas flows from the reservoir tank (107), the reservoir tank (107) pressure decreases. Generally, when the reservoir tank (107) hits a particular target pressure, the controller (103) will determine that the reservoir tank (107) needs to be refilled and the controller (103) will trigger the compressor (101) to operate. The gas will be fed to the tank (107) until the pressure in the reservoir tank (107) is restored to its target holding pressure. This operation of the loss and replacement of air within the system (100) may be monitored by the controller (103) to provide for pressure monitoring over time.

In an embodiment, the pressure decrease can be calculated before the reservoir tank (107) has been depleted to its refill threshold. This can be done by providing a pressure sensor (125) which continuously monitors the pressure in the reservoir tank (107). The controller (103) can then determine the rate of drop of the pressure over time by simply calculating the drop between sensor output indications from the sensor (125). As the sensor (125) may report back at known fixed intervals, the rate can be determined for any of these intervals regardless of the current pressure in the reservoir tank (107). This type of detection, however, would not be directly able to determine if the leak is being caused by leaks in the sprinkler system (109), reservoir tank (107), or some combination of both. To assist in narrowing this down, a sensor (125) may also be positioned to monitor the pressure in the sprinkler system (109) outside the tank (107) (and typically having a different starting pressure). The values of both sensors (125) may then be used by the controller (103) in determining the pressure loss and the relative positions of the leaks.

In an alternative embodiment, the controller (103) can monitor the pressure in the sprinkler system (109) directly. This can provide for more direct measurement of the rate of any leak. However, because of the relatively quick reaction to supply gas from the reservoir tank (107), it can be difficult to infer an accurate leak rate over time from this value. Specifically, there is no need for the pressure in the system (109) to fall below a set point before gas is provided from the reservoir tank (107). As the appropriate fill gas may be provided to the reservoir tank (107) as part of a direct feedback loop continuously or at very small time intervals, purely monitoring the pressure in the sprinkler system (109) may not provide as accurate rates as other monitoring methods contemplated herein.

In a further embodiment, instead of actually monitoring pressure, the leak rate may be estimated by monitoring operation of the compressor (101). This can be useful in situations where sensors (125) which can measure the sprinkler system (109) pressure may not be present. Further, it can be a simpler task to perform as pressure calculations over a fixed window are not actually necessary. Instead, the controller (103) simply needs to know when the compressor (101) is operating and the various set points at which the reservoir tank (107) and/or sprinkler system (109) is to be refilled.

This type of embodiment can be particularly useful in an air source (171) arrangement where the compressor (101) is a riser mounted air compressor (301). This is where the air compressor (101) is mounted on the riser (309) of the sprinkler system (109). One such embodiment is illustrated by the automated leak rate testing and monitoring system (200) of FIG. 2. In the operation of FIG. 2, one can determine the leak rate by simply knowing the cut-in and cut-out of the riser mounted air compressor's (301) internal pressure switch and then monitoring operation of that switch. In typical operation, a riser mounted air compressor (301) will sit idle when the internal pressure switch is above a particular pressure. When the pressure is above this first value $P_1$, the sprinkler system (109) is at the desired pressure of operation and the internal pressure of the air compressor (301) is at or above this fixed pressure. The riser mounted air compressor (301) can provide additional pressure to the system (109) by activating and compressing additional air into the riser (309), and thus the system (109), when the pressure drops below the value $P_1$. This pressure $P_1$ is commonly referred to as the "cut-in" pressure as it is when the riser mount air compressor (301) starts in operation.

To prevent the riser mounted air compressor (301) from operating in many short bursts around the cut-in pressure, when the riser mounted air compressor (301) activates because the pressure in the system (109) is below the cut-in pressure, the riser mounted air compressor (301) will typically not just pressurize the system to just above the cut-in pressure, but will instead go to a higher pressure $P_2$ which is the "cut-out" pressure. In this way, the system (109) is pressurized to a pressure $P_2$, a known amount above the pressure $P_1$, to provide a greater time delay between necessary operation of the riser mount air compressor (301) from the first time that the riser mounted air compressor (301) recognizes a drop below pressure $P_1$ and the subsequent time the riser mounted air compressor (301) recognizes a drop below pressure $P_1$. This means that the riser mount air compressor (301) operates at a longer time for fewer time intervals.

Because of this operation and the space between the two different pressures $P_1$ and $P_2$, there is a relationship formed between the rate of pressure loss in the system (109), the amount of time it takes the riser mounted air compressor (301) to fill the system from $P_1$ and $P_2$, and the amount of time between successive operations of the riser mounted air compressor (301). These can be used to determine the rate of pressure loss without the need to provide the sensor (125) on the system (109).

In one version of the operation of FIG. 2 (or of FIG. 1, if desired), the time which it takes the air compressor (301) to fill the system (109) (e.g. to pressurize from the cut-in pressure to the cut-out pressure) can be recorded. As the cut-in and cut-out pressure are set values, this provides a pressure difference from which, based on the volumetric size of the sprinkler system (109) which can be user input into the controller (103), one can calculate the pressure loss and, thus, volume loss over time.

Similarly, one can calculate the time difference between successive fill operations of the air compressor (301). That is, one can determine the amount of time it takes from when the air compressor (301) turns off (the cut-out pressure) until the time it turns on (the cut-in pressure). In this case, the rate of pressure loss is simply the difference between the cut-out and cut-in pressure values for the known volume over the determined time between fill operations.

While either of the above calculations provide for a loss rate based on the time between the successive off and on (or on and off) operations of the air compressor (301), this can be easily normalized by extrapolating the data to determine pressure loss over a fixed time period such as, but not limited to, one hour, one day, weekly, etc. This extrapolation can also be used to determine if the system needs to have a formal test performed or even can be used to verify if the system (109) passes a formal leak rate test or not. As in the embodiment of FIG. 1, data may be reported by the controller (103) in any fashion including via a network (201) to a smart device (203).

As should be apparent, while the above operation is discussed in conjunction with FIG. 2, extrapolation of rate from operation (on and off operations) of the air compressor (301) can also be used in the embodiment of FIG. 1. For example, in an embodiment of the operation of FIG. 1, the compressor (101) will be able to push 5 standard cubic feet of air per minute (5 scfm) of flow into the system (100). The sprinkler system (109) is presumed to be initially filled to 40 PSIG which is its supervisory pressure. The reservoir tank (107) also begins filled to its operational pressure which is 65 PSIG in this example.

Should the sprinkler system (109) later develop a small leak (for example of 0.01 scfm), the reservoir tank (107) will supply gas to the sprinkler system (109) to maintain the pressure in the sprinkler system (109) at essentially 40 PSIG. When the tank (107) pressure drops below 60 PSIG from this small leak, the controller (103) knows to activate the compressor (101) to supply gas to the reservoir tank (107) at the rate of 5 scfm as discussed above to return it to its set point pressure. In this way, the equilibrium pressure of 40 PSIG in the sprinkler system (109) is maintained and the reservoir tank (107) is filled even while the sprinkler system (109) is leaking.

The controller (103) can then monitor the operation of filing of the tank (107) and operation of the compressor (101) simply by recording the times at which the compressor (101) operated, and the amount of gas provided, or the time that the compressor (101) ran. In this example, the drop of 0.01 scfm from the sprinkler system will result in the tank dropping from its starting 65 PSIG to 60 PSIG in essentially 500 minutes. Thus, the compressor (101) will turn on about every 500 minutes for essentially one minute to refill the reservoir tank (107). The controller (103) can monitor when the compressor (100) activates.

In this case, operation every 500 minutes would correspond to the system loosing 5 PSI in 500 minutes, which corresponds to a loss of 1.2 PSI in 2 hours. This is below the rate at which the sprinkler system (109) would fail an NFPA 25 test and may be deemed acceptable to not trigger an alarm. However, if the rate of loss increased to 0.03 scfm, the system would now fail the NFPA 25 test as the compressor would be operating at a rate indicative of a greater than 3 PSI loss in 2 hours. This may trigger an alarm situation Thus, this type of near continuous monitoring can allow the system to detect a leak rate which would result in an NFPA 25 test failure.

Regardless of the actual leak rate detected, a user may be notified or the system may attempt to verify the loss in the event that certain criteria about the loss are met. For example, if the loss rate were to increase over a certain amount in a certain time. In an example, if the controller (103) determines that compressor (101) operation is indicative of a concern, the controller (103) may schedule and initiate an actual NFPA test in accordance with those discussed above at the earliest opportunity. Should the sprinkler system (109) pass the test, the compressor (101) operation may be considered anomalous and ignored. Should it fail, the warning may then be sent or an additional warning may be provided. In the event that the system should have compressor (101) operation which appears to be a failure followed by passing actual NFPA 25 testing, the controller (103) may send notice that compressor (101) may be malfunctioning or that a leak may exist in the system (100) outside of the sprinkler system (109) (for example, in an internal air tank in compressor (101)). Regardless of the specifics of the situation detected, the leak information may be used by a user to schedule additional maintenance or testing, or can be stored in memory for later reference.

Should a large leak develop in the sprinkler system (109) the controller (103) will continue to automatically supply gas to the sprinkler system (109) allowing it to remain pressurized indefinitely so long as the large leak is below 5 scfm because the reservoir tank (107) can still pressurize faster than the sprinkler system (109) can leak. Even if a very large leak occurred (one above 5 scfm) the compressor (101) would still allow the reservoir tank to attempt to maintain the pressure in the sprinkler system (109) above 40 PSIG for as long as possible. It should also be recognized that a very large leak may actually be activation of the fire sprinkler system (109), and thus this situation may be treated simply as an activation of the sprinkler system (109).

Regardless, in these large leak situations, the compressor (101) would be running much more than normal (and may be running continuously). Thus, the controller (103) would typically alert a user that a potentially major issue has arisen as soon as this situation is detected. This allows for those responsible for the system (100) to become aware of the presence of a large leak, or that a leak appears to be increasing at a much higher than desired rate, and react accordingly. Further, because the size of the leak (e.g. its flow rate) can be estimated, that leak rate can be provided to the users as well. From that, the user can determine the urgency of a need to repair, or if this is not a leak at all but a system activation. Generally, the urgency will not be extreme as leak rates usually increase slowly over time.

In this prior embodiment, there is no need to continuously monitor the actual pressure in the sprinkler system (109) as the system (100) will essentially operate in a dumb mode with the reservoir tank (107) simply supplying pressure in a manner to keep the pressure in the sprinkler system (109) at the maintenance pressure. That is, the controller (103) does not need to know the pressure in the sprinkler system (109) to react to a pressure drop in the sprinkler system (109) because it can react based on a pressure drop in the reservoir tank (107) from the reservoir tank (107) automatically discharging to the sprinkler system (109) when the pressure in the sprinkler system (109) decreases.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "spherical" are purely geometric constructs and no real-world component or relationship is truly "spherical" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method for automatically determining the leak rate of a fire sprinkler system, the method comprising:
    providing a fire sprinkler system which is to be maintained at a system pressure above ambient;
    providing a compressor for supplying gas to said fire sprinkler system to maintain said fire sprinkler system at said system pressure;
    repeatedly sensing said system pressure is below a cut-in pressure and activating said compressor, said compressor supplying gas to said fire sprinkler system until said system pressure is at a cut-out pressure when said compressor ceases supplying gas;
    measuring an amount of time lapsed between a first time when said system pressure is at said cut-in pressure and a subsequent time when said system pressure is at said cut-out pressure; and
    using said time lapsed and said difference between said cut-in pressure and said cut-out pressure to calculate a leak rate for said fire sprinkler system.

2. The method of claim 1 wherein said gas comprises air.

3. The method of claim 1 wherein said gas comprises nitrogen.

4. The method of claim 1 wherein said calculated leak rate is used to schedule a further leak test of said fire sprinkler system.

\* \* \* \* \*